US008196887B2

(12) United States Patent
Dahlbacka et al.

(10) Patent No.: US 8,196,887 B2
(45) Date of Patent: Jun. 12, 2012

(54) SEAT MOUNT WITH INTEGRATED ADJUSTMENT

(75) Inventors: Bruce Dahlbacka, Port Washington, WI (US); Kenneth Braun, Mequon, WI (US)

(73) Assignee: Milsco Manufacturing Company, A Unit Of Jason Incorporated, Milwaukee, WI (US)

( * ) Notice: Subject to any disclaimer, the term of this patent is extended or adjusted under 35 U.S.C. 154(b) by 1041 days.

(21) Appl. No.: 11/908,856

(22) PCT Filed: Mar. 23, 2006

(86) PCT No.: PCT/US2006/010748
§ 371 (c)(1),
(2), (4) Date: Mar. 5, 2008

(87) PCT Pub. No.: WO2006/102580
PCT Pub. Date: Sep. 28, 2006

(65) Prior Publication Data
US 2009/0212190 A1   Aug. 27, 2009

Related U.S. Application Data

(60) Provisional application No. 60/664,598, filed on Mar. 23, 2005.

(51) Int. Cl.
*F16M 13/00* (2006.01)
(52) U.S. Cl. ............... 248/429; 248/424; 297/344.1; 384/47; 296/65.13
(58) Field of Classification Search .......... 248/429, 248/424; 297/344.1, 344.11, 344.21, 344.24; 384/47, 26, 42; 296/65.13
See application file for complete search history.

(56) References Cited

U.S. PATENT DOCUMENTS

| 4,291,856 | A |   | 9/1981 | Urai et al. | |
|---|---|---|---|---|---|
| 4,478,383 | A |   | 10/1984 | Urai et al. | |
| 4,671,572 | A |   | 6/1987 | Young et al. | |
| 4,741,506 | A |   | 5/1988 | Schwaegerle | |
| 5,037,155 | A | * | 8/1991 | Holm et al. | 296/65.13 |
| 5,044,694 | A | * | 9/1991 | Koa | 297/452.12 |
| 5,074,620 | A |   | 12/1991 | Jay et al. | |
| RE35,485 | E | * | 4/1997 | Stewart | 248/429 |
| 5,876,085 | A | * | 3/1999 | Hill | 296/65.02 |
| 6,010,194 | A | * | 1/2000 | Cykon | 297/440.22 |
| 6,027,168 | A |   | 2/2000 | Crossman et al. | |
| 6,105,921 | A |   | 8/2000 | Carrig et al. | |
| 6,634,711 | B2 | * | 10/2003 | Phillips et al. | 297/337 |
| 6,688,692 | B2 |   | 2/2004 | Phillips et al. | |
| 6,799,803 | B1 |   | 10/2004 | Lee et al. | |
| 6,945,505 | B2 | * | 9/2005 | Hohnl et al. | 248/424 |
| 6,986,550 | B2 | * | 1/2006 | Gevaert et al. | 297/337 |
| 7,086,657 | B2 | * | 8/2006 | Michelau et al. | 280/282 |
| 7,523,981 | B2 | * | 4/2009 | Karube et al. | 296/198 |
| 7,648,115 | B2 | * | 1/2010 | Lambert et al. | 248/429 |
| 7,887,020 | B2 | * | 2/2011 | Ferguson et al. | 248/429 |
| 2004/0011939 | A1 | * | 1/2004 | Hohnl et al. | 248/424 |
| 2004/0089785 | A1 |   | 5/2004 | McCullen et al. | |

FOREIGN PATENT DOCUMENTS

| DE | 9421432 | 1/1996 |
|---|---|---|
| DE | 10065311 | 7/2002 |

* cited by examiner

*Primary Examiner* — Terrell McKinnon
*Assistant Examiner* — Michael McDuffie
(74) *Attorney, Agent, or Firm* — Boyle Fredrickson, S.C.

(57) ABSTRACT

A seat mount with integrated adjustment that includes a seat base with integrally molded slide bearing receiving pockets that each receives an integrally formed slide bearing of one piece and unitary construction that engages apertures formed in a seat mount that preferably is a seat slide plate or seat mounting plate.

23 Claims, 14 Drawing Sheets

SEAT MOUNT WITH INTEGRATED ADJUSTMENT

CROSS REFERENCE TO RELATED APPLICATION

This application claims all benefits of and priority under 35 U.S.C. Section 119(e) to U.S. Provisional Application Ser. No. 60/664,598, filed Mar. 23, 2005, the entirety of which is hereby expressly incorporated herein by reference.

FIELD OF THE INVENTION

The present invention relates to a seat mount assembly that is capable of providing fore and aft seat adjustment for a vehicle and more particularly a seat mount integrated at least partially with a seat shell configured to retain a seat slide component and which is capable of accommodating a latch and a seat slide component capable of being of one piece and unitary construction.

BACKGROUND OF THE INVENTION

Manufacturers of simple seat mount and adjustment systems have used, or are currently using, a conventional steel mounting plate with laterally spaced parallel slots that allow fore and aft movement of a seat and a series of holes to facilitate latching the seat in a desired fore and aft position. The mounting plate typically contains flanges formed perpendicular to the seat mounting surface. The formed flanges, located towards the forward end of the mounting plate, attach to a second bracket mounted to the vehicle using pivot bolt or rod. Two compression springs generally support the rearward end of the mounting plate to provide suspended travel of the mounting plate and the seat. The seat is attached to the mounting plate with sets of threaded fasteners that pass through an arrangement of washers and bearings and the parallel slots in the mounting plate. Each threaded fastener is secured to the seat pan using a threaded nut typically welded or mechanically fastened to the seat pan. Four sets of threaded fasteners and washers, arranged in two parallel rows typically engage a pair of parallel slots and are secured to the seat pan. A spring biased latch bar attached with threaded fasteners to the seat, or to a secondary bracket that is attached to the seat, engages the holes in the slide plate to position the seat in desired fore/aft location. The above components are generally assembled at the same time the seat is installed on the vehicle.

Another simple seat mounting and adjustment system consists of a seat shell with rails and threaded nuts, a mounting plate with receiving channels and a central slot, a shoulder bolt, and a threaded hand knob. The seat shell contains two raised parallel rails that are either molded into the seat shell during the manufacture of the seat shell or formed from a secondary plate and subsequently mechanically fastened to the bottom of the seat shell. The seat shell or secondary plate also contains two internally threaded nuts secured to the shell to receive the shoulder bolt and the threaded knob. The mounting plate contains two receiving parallel channels that align and capture the raised rails of the seat. A slot located between the channels is pierced into the mounting plate and has a length to accommodate the desired fore and aft adjustment range. The shoulder bolt is inserted thru the slot in the mounting plate and is secured to one of the threaded nuts in the seat shell. The shoulder of the bolt is tightened using an appropriate tool against the threaded nut. A hand operated threaded knob is inserted thru a washer, thru the slot in the mounting plate and is secured to the second of the threaded nuts in the seat shell. The threaded knob is tightened by hand fixing the mounting plate to the seat shell. Loosening the threaded knob allows the seat fore-aft position to be adjusted to an infinite number of positions defined by the length of the slot in the mounting plate.

What is needed is a seat mount and slide element that is of simple, durable, robust and economical construction.

SUMMARY OF THE INVENTION

The invention is directed to a vehicle seat mount preferably for an off-road vehicle that includes a seat shell equipped with at least part of an integrated seat adjuster. In a preferred embodiment, the shell is configured to accommodate a plurality of a seat slide component and capable of accommodating a seat position latch or assembly thereof. In a preferred embodiment, the seat slide component is of one piece and unitary construction. In a preferred embodiment, the seat slide component is of snap-in construction. In a preferred embodiment, at least a plurality of seat slide components and latch cooperates with a base or more preferably a plate to releasably retain the seat in a desired position.

One objective of a seat mount constructed in accordance with the present invention was to provide a low cost seat and mount assembly and a fore and aft adjustment that can be fixed in a number of positions between the limits of the adjustment travel. Preferred embodiments of the present invention accommodate a plurality of arrangements employable for enabling the relative location of the adjustable seat and the seat support to be releasably fixed in a stable, secure position were required. A further objective of a seat mount constructed in accordance with the invention is to be capable of attachment to a seat support without the use of tools.

To provide a seat mount assembly of low cost construction, a preferred embodiment of a seat mount assembly constructed in accordance with the invention employ a minimum of components while still achieving functional requirements. In a preferred embodiment, a seat mount assembly capable of fore-aft seat adjustment is constructed and arranged so as to use no fasteners.

Another objective of a seat mount constructed in accordance with the invention is to provide a seat mount assembly that engages a seat support capable of being adapted to a variety of vehicles. A seat support constructed in accordance with the invention can be configured to provide a pivoting relationship between the seat and the vehicle to allow secondary suspending elements to be mounted between the seat support and the vehicle. Such a seat support can also be configured to provide a pivot constructed and arranged to allow the seat to be rotated to a non-use position such as for access to a battery, fuel cap, or something else located under the seat assembly.

A seat assembly made in accordance with the present invention presents many significant advantages over prior art seat mounting and adjustment systems. Prior art seat mounting systems can require over twenty components to attach the seat to the mounting plate and provide the fore and aft adjustment and latching functions. In the preferred embodiment, the same functionality is capable of being provided with as few as four components. Prior art mounting systems also require secondary plates to contain nuts or rails to engage with channels in the seat mount and retain threaded fasteners. These secondary plates increase the overall cost of the seat mounting system. The significant reduction in components and preferred elimination of secondary plates reduces the tooling expenses required to manufacture the inventive seat mount, reduces inventory, reduces the labor required to assemble the components of the seat assembly, reduces the labor to assemble the seat assembly to the vehicle, and improves the ergonomics of the seat assembly and installation processes.

Objects, features and advantages of the invention include one or more of the following: providing a seat mount of unitary construction; a seat mount of molded and tool-less construction; a seat mount with an integrated adjuster arrangement; a seat mount with integral adjuster equipped with a latch arrangement that is positively locking and that enables adjustment; and a seat mount and slide element therefor that is of economical construction, that is robust, that is reliable, that is long-lasting, that is more durable, that is of simple construction, and which is quick to make and easy to use.

Various other features and advantages of the present invention will also be made apparent from the following detailed description and the drawings.

BRIEF DESCRIPTION OF THE DRAWINGS

The drawings illustrate the best mode currently contemplated of practicing the present invention. One or more preferred exemplary embodiments of the invention are illustrated in the accompanying drawings in which like reference numerals represent like parts throughout and in which.

Figure 1:
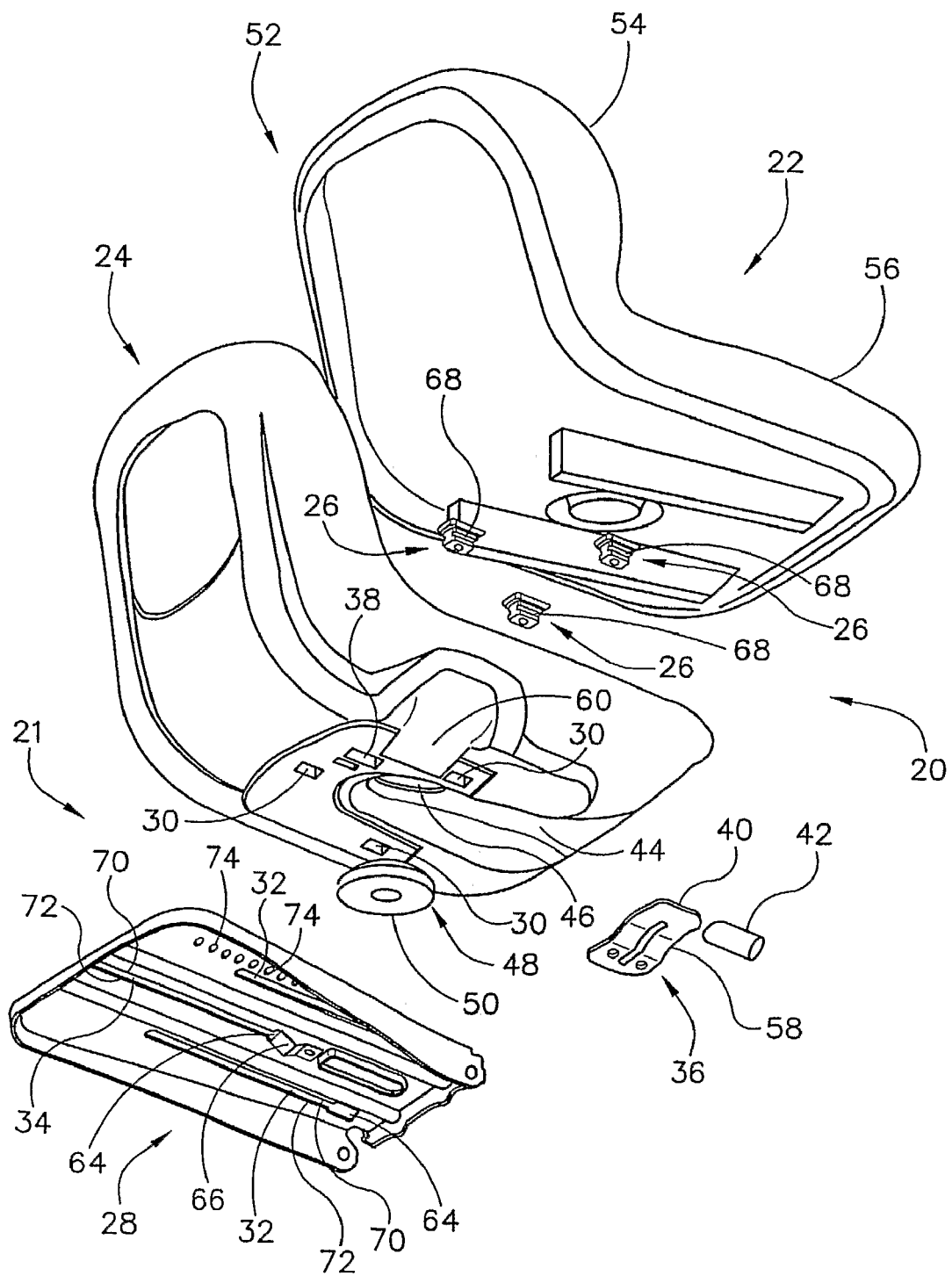
FIG. 1 is an exploded perspective view of a fore-aft adjustable vehicle seat assembly and seat mount according to the present invention.

Before explaining one or more embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF AT LEAST ONE PREFERRED EMBODIMENT

FIG. 1 illustrates an exploded rear bottom perspective view of a fore-aft adjustable vehicle seat arrangement 20 constructed in accordance with the invention. The vehicle seat arrangement 20 shown in FIG. 1 includes a seat occupant supporting arrangement 22, which can be of unitary construction, a seat shell 24, and a plurality of slide bearings 26 which are cooperable with a slide plate 28 that can be part of a seat base (not shown), vehicle chassis (not shown), or some other part of the seat, e.g. a seat pan. The slide bearings 26 are received in complementary slide bearing receiving pockets 30 formed in the seat shell 24 so as to locate or orient part of the bearing in a manner so it is engageable with the slide plate 28. The slide plate 28 has a plurality of spaced apart and generally parallel elongate channels 32 and 34 formed in it, each of which is configured for accepting part of a corresponding one of the slide bearings 26.

Also shown in FIG. 1 is a seat slide latch 36 that is receivable in a latch receiver pocket 38 (FIG. 5) that preferably is also formed in the shell 24. The free end of the latch 36 preferably is configured to provide a manually graspable handle portion 40 and can also be shaped or otherwise configured to accommodate a separate handle 42 that can be mounted to the handle portion 40 such as in the manner depicted in FIG. 1.

The shell 24 can also include a receptacle 44 disposed between a plurality of the slide bearings pockets 30 that preferably includes an opening 46 that accommodates a cap 48 that can be configured with a plurality of flanges (not shown) that pass between retainer tabs (not shown) circumferentially spaced about the receptacle 44 such that the cap 48 can be releasably retained thereafter when inserted into the receptacle 44 rotated relative to the shell 24. Such a cap 48 preferably is a utility cap, such as one which carries a seat occupant sensor (not shown) or the like used in sensing when a seat occupant (not shown) is sitting on the seat. When so equipped, the cap 48 preferably includes a coupling or connector, such as an electrical connector like a plug 50 or like used to communicate electrical signals from the sensor to electrical equipment onboard the vehicle that processes such signals. Caps having different configurations and functions can also be employed. It is contemplated that in at least some instances such a cap may not be needed.

The seat occupant supporting arrangement 22 preferably includes one or more cushions or the like upon which a seat occupant, e.g., operator, sits during use. The seat occupant supporting arrangement 22 overlies the seat shell 24 to which it is attached or assembled in making the seat. In a preferred embodiment, the seat occupant supporting arrangement 22 includes at least one cushion 52 that can be of flexible, elastomeric and resilient construction. In the preferred embodiment shown in FIG. 1, the seat occupant supporting arrangement 22 includes a seat backrest cushion 54 and a seat cushion 56 that underlies the thighs and buttocks of a seat occupant.

In a preferred embodiment, the seat occupant supporting arrangement 22 is of one-piece and unitary construction. In another preferred embodiment, the seat occupant supporting arrangement 22 is of one-piece, unitary and homogeneous construction. For example, the seat occupant supporting arrangement 22 can be made of an open cell or closed cell foam, such as a urethane foam or the like. It can be molded, including molded onto or around the seat shell 24 if desired.

As is shown in FIG. 1, the seat occupant supporting arrangement 22 overlies and preferably engages the seat shell 24 such that they are attached to one another, such as by bonding, molding or another suitable means of attachment. The shell 24 preferably is made of plastic and formed, preferably by molding or the like. In a presently preferred embodiment, the shell 24 preferably is blow molded of a high molecular weight polyethylene plastic but can be made of an equivalent injection moldable resin.

As also shown in FIG. 1, a plurality of slide bearings 26 are disposed between the seat occupant supporting arrangement 22 and the shell 24. In a presently preferred embodiment, a plurality of pairs (i.e. at least three) of slide bearings 26 are used. Each slide bearing 26 preferably is of one-piece, unitary and homogenous construction such that each is formed as a unit. Each slide bearing 26 preferably is made of a formable material, such as, plastic, a composite, or another type of synthetic material. In a presently preferred embodiment, each slide bearing 26 is injection molded from an engineered resin selected to provide adequate strength and wear resistance for the application.

Each slide bearing 26 is assembled to the shell 24 in a self-retaining manner by being received in one of the pockets 30 formed in the shell. When received in a corresponding pocket 30, snap-fit engagement between slide bearing 26 and shell 24 retains the slide bearing 26. Preferably, it positively attaches each slide bearing 26 to the shell 24. In the preferred embodiment depicted in FIG. 1, each slide bearing 26 is installed in the shell 24 prior to assembly of the seat occupant supporting arrangement 22, e.g. cushion. While an interference fit and/or snap fit between each slide bearing 26 and the shell 24 anchors each slide bearing 26 to the shell 24, an adhesive (not shown) can be employed as an additional means to keep the slide bearing 26 anchored. In another preferred embodiment, which is not shown, one or more of the slide bearings 26 molded into the shell 24. For example, if desired, the slide bearings 26 can be insert molded into the shell 24.

Each slide bearing 26 has an exposed portion that is received in a corresponding elongate travel slot or channel formed in a component located below the shell. In the preferred embodiment shown above in FIG. 1, the component is a slide plate 28 and each slide bearing 26 is received in a corresponding elongate travel slot or channel 32 or 34 formed in the plate.

The preferred embodiment of the seat slide latch 36 is an elongate latch bar 58 of three dimensionally contoured construction. The latch bar 58 preferably is biased by a spring 62, such as a coil spring (FIG. 5), into latching engagement with the slide plate 28 to oppose fore-aft seat adjustment. When the latch bar 58 is disengaged, an operator can adjust the fore-aft seat position by moving the seat 20 relative to the slide plate 28. If desired, a one-piece self-biasing latch bar (not shown), such as a spring steel latch bar, could be used in the place of the separate latch bar 58 and spring 62 arrangement of the preferred embodiment.

During assembly of the vehicle seat arrangement 20 to the slide plate 28, the latch bar 58 of the seat slide latch 36 preferably must be held in a released position. In the preferred embodiment shown in FIG. 1, the released position disposes the latch bar 58 upwardly toward and preferably adjacent an outer wall 60 of the shell 24. This is done to prevent the latch bar 58 from catching or otherwise inadvertently engaging the slide plate 28.

The vehicle seat arrangement 20 is mounted to the slide plate 28 by inserting a part of each of the three slide bearings 26 though a corresponding enlarged forward insertion aperture 64 of each one of the slide plate channels or slots 32 and 34. The central slide bearing 26 depresses a stop spring finger 66 that overlies at least part of the enlarged forward insertion aperture 64 of the center slide plate channel 34 during insertion. The stop spring finger 66 opposes withdrawal of at least the slide bearing 26 received in the center slide plate channel 34.

The seat arrangement 20 preferably is then moved rearward relative to the slide plate 28 to engage grooves 68 in each slide bearing 26 with slot or channel walls 70 and 72 defined by opposing portions of the slide plate 28 lying on each side of the channel or slot 32, 34 in which the bearing 26 is received. Releasing the latch bar 58 causes the seat slide latch 36 to engage the nearest one of a plurality of latch holes 74 formed in the slide plate 28, locking the vehicle seat arrangement 20 in a specific fore/aft location.

Figure 2:
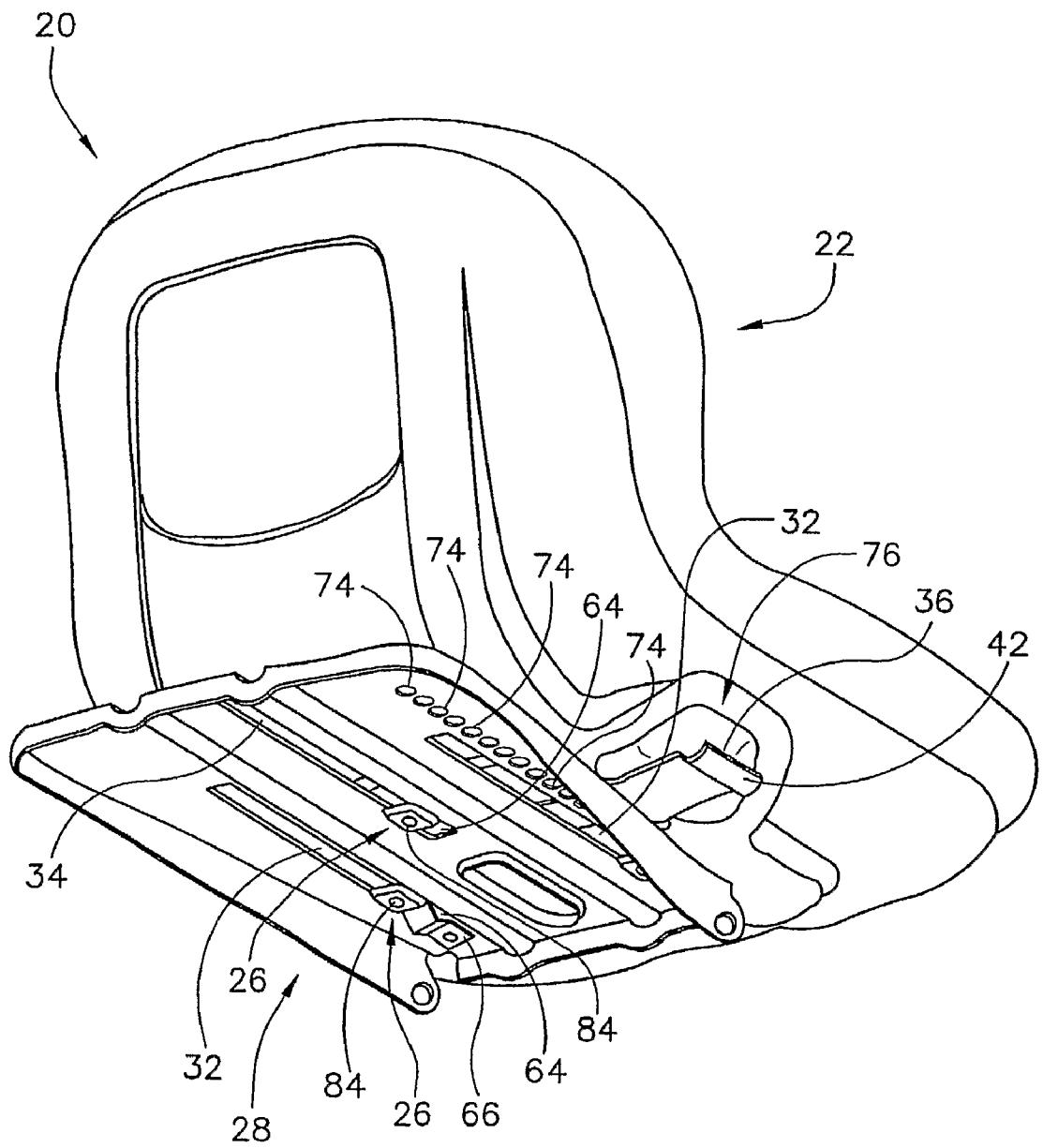
FIG. 2 is a bottom perspective view of the fore-aft adjustable vehicle seat assembly of FIG. 1 after completion of assembly to a slide plate, e.g. seat mount.

FIG. 2 illustrates a rear bottom perspective view of the fore-aft adjustable vehicle seat arrangement 20 depicted in FIG. 1 after completion of assembly to the slide plate 28. The slide plate 28 is of pivotal mount construction such that it is pivotally mountable to a chassis or frame of a vehicle (not shown). As is shown in FIG. 2, the seat shell 24 preferably is formed by molding an integral handle recess 76 into the shell 24 that accommodates at least a handle 42 of the seat slide latch 36.

Figure 3:
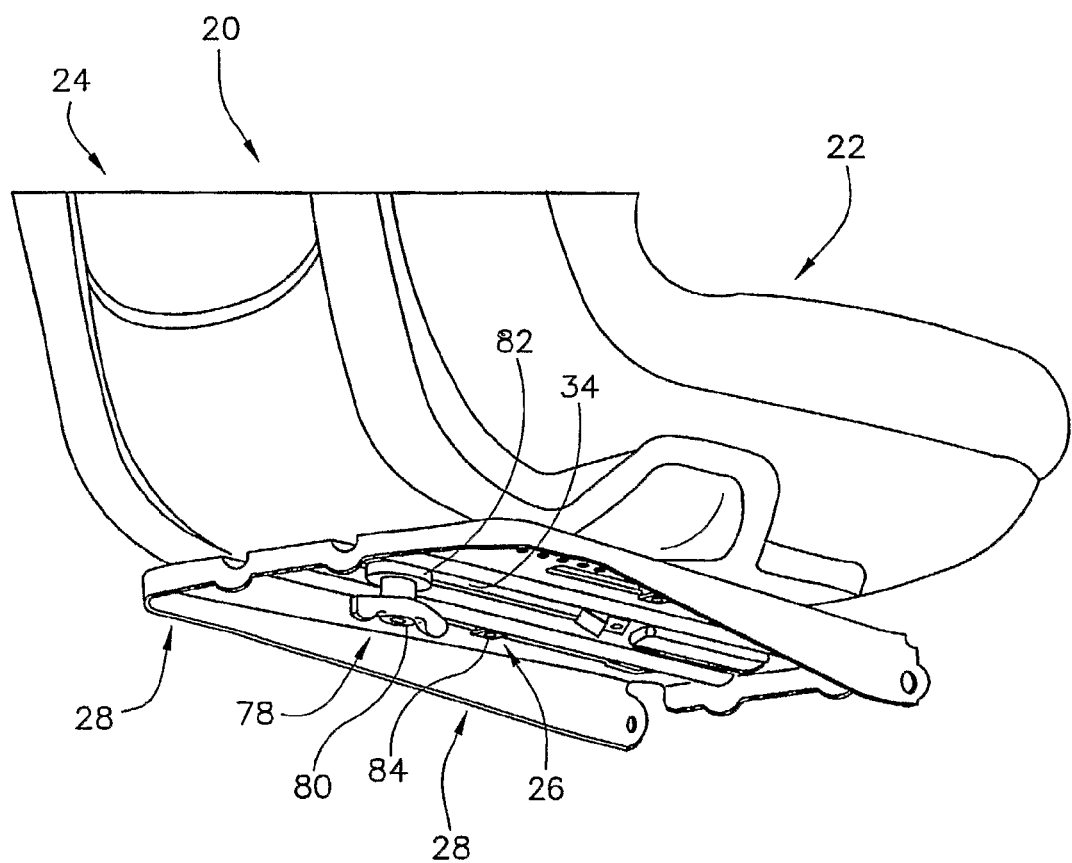
FIG. 3 is a bottom perspective view of a second preferred embodiment of the fore-aft adjustable vehicle seat assembly and seat mount of the invention.

FIG. 3 illustrates another preferred embodiment where the latch bar 58 has been replaced with a type of fore-aft latching or locking arrangement 78 that preferably includes a threaded hand knob 80 and a cup washer 82 to lock the vehicle seat 20 in the desired fore/aft position. As is also shown more clearly in FIG. 2, each slide bearing 26 contains a threaded hole 84 capable of receiving the threaded shaft or shank (not shown) of such a hand knob 80. Tightening the knob 80 clamps the slide plate 28 to the bottom of the seat shell 24.

Figure 4:
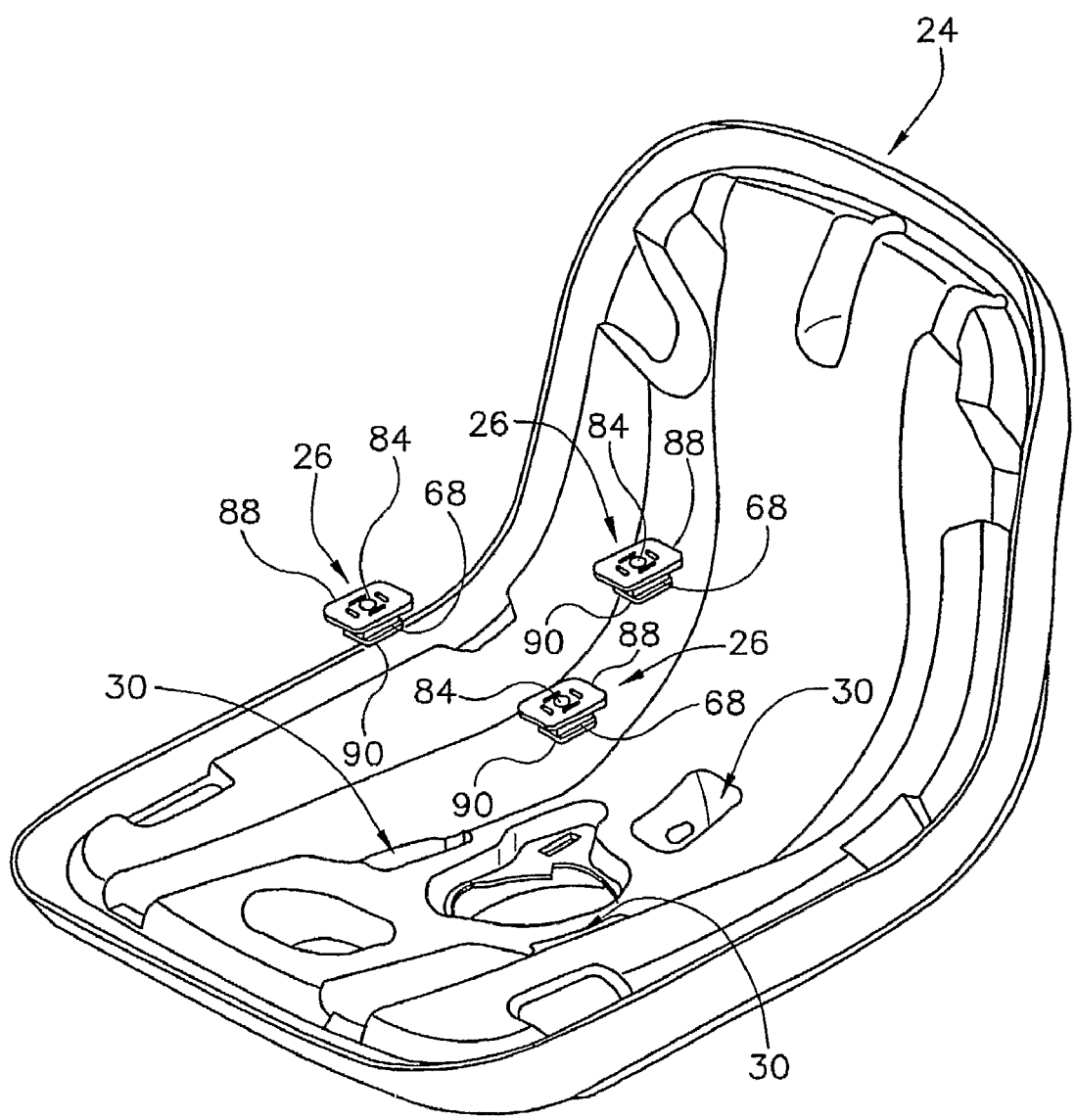
FIG. 4 is an exploded top perspective view of a seat shell and seat slide bearings that attach to the shell.

FIG. 4 illustrates a preferred embodiment of a seat shell 24 in more detail. The shell 24 includes an interior shell surface 86 constructed and arranged to receive and retain at least a plurality of seat slide bearings 26. For example, FIG. 4 illustrates three seat slide bearings 26 in position for assembly to part of the seat shell 24 with assembly preferably taking place by inserting each bearing 26 into a corresponding pocket 30 by bringing the bearing 26 toward the pocket 30 from the interior shell surface side of the shell 24.

Figure 5:
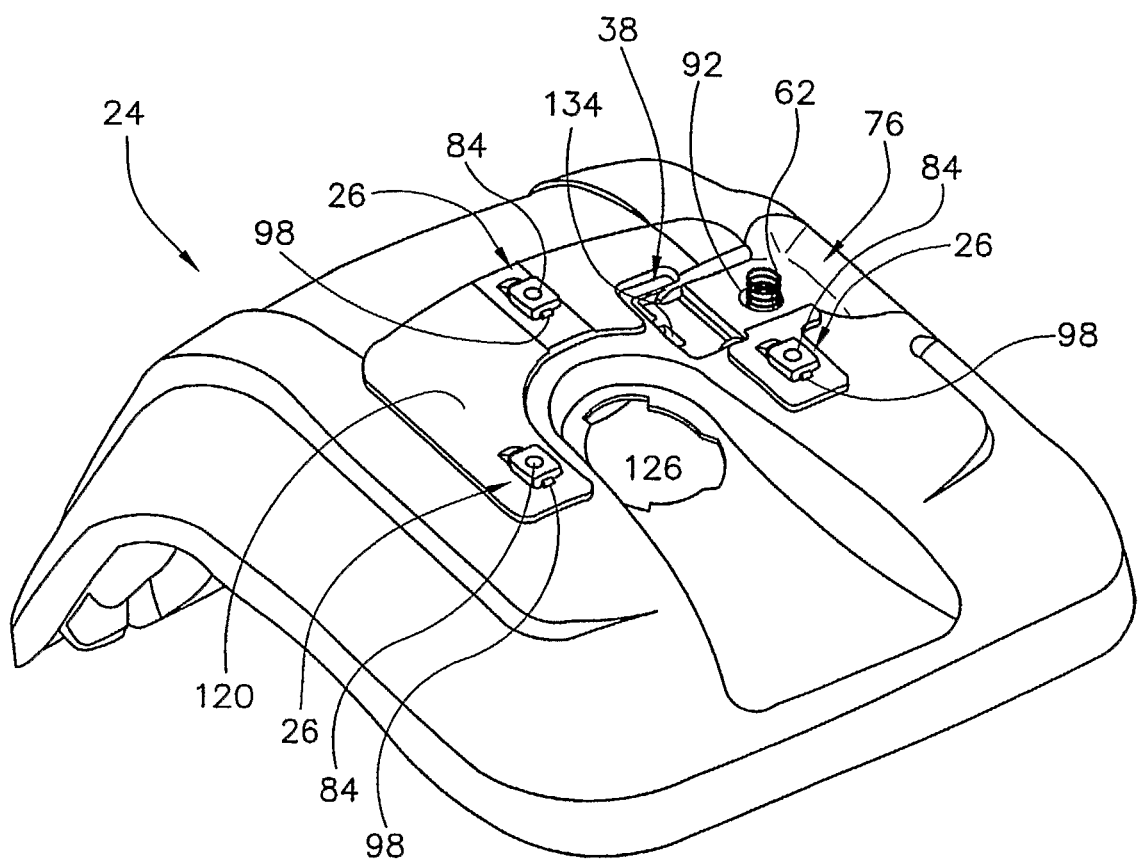
FIG. 5 is a bottom perspective view of the shell of FIG. 4 with the slide bearings attached to the shell.
Figure 6:
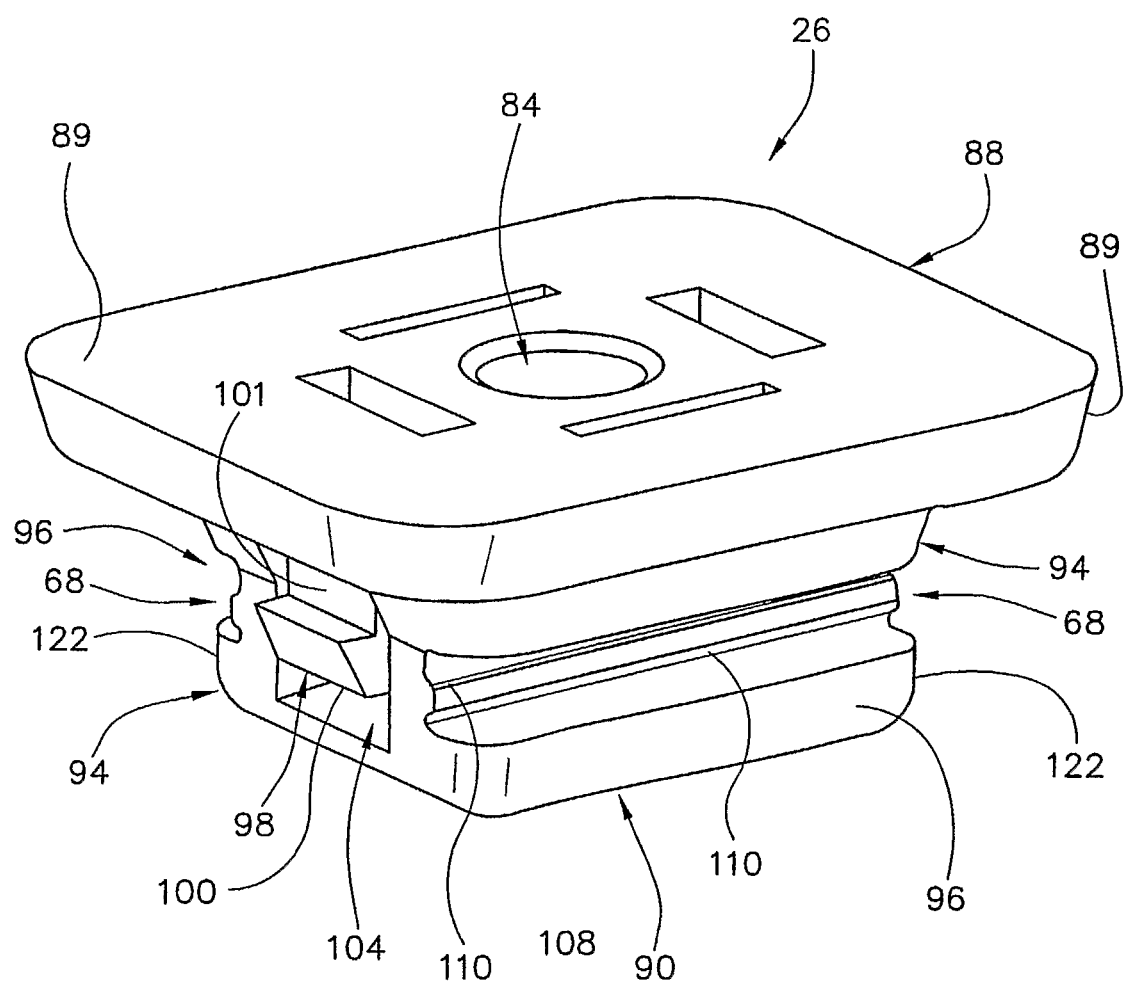
FIG. 6 is an enlarged perspective view of a preferred embodiment of a seat slide bearing constructed in accordance with the invention.

Referring additional to FIGS. 5 and 6, each seat slide bearing 26 is configured of snap-in construction and has an enlarged retainer base 88 that helps in anchoring the bearing 26 to the shell 24 upon assembly. Each seat slide bearing 26 includes a narrower head 90 that projects outwardly from the base 88 and that extends into and preferably through a through-hole (not shown in FIG. 4) formed in the corresponding bearing retainer pocket 30 in the shell 24 in which the bearing 26 is assembled.

As is shown in FIG. 5, part of the head 90 extends outwardly of the outer surface of the shell 24 when assembled to the shell 24. For example, when snapped into one of the bearing retainer pockets 30 of the shell 24, a sufficient amount of the head 90 of the seat slide bearing 26 extends outwardly of the shell 24 so as to expose groove or grooves 68 in the bearing. Doing so permits each groove 68 in the head 90 of each bearing 26 to be sufficiently exposed so as to permit slidable engagement with the slide plate 28 when inserted into one of the slide plate channels or slots 32 and 34.

FIG. 5 shows the bottom of the seat shell 24 after each of three seat slide bearings 26 have been snapped into place. As previously discussed, the head 90 of each seat slide bearing 26 extends outwardly beyond the outer surface of the shell 24 so that it can engage another part of a seat assembly below it, preferably the slide plate 28. As is more clearly shown in FIG. 6 below, each slide bearing 26 includes an enlarged anchor base 88 that stops against part of the seat shell 24 to prevent the slide bearing 26 from being pushed through or pulled out of the shell 24.

With continued reference to FIG. 5, where the latch bar 58 of the seat slide latch 36 is biased by a separate spring 62, the outer surface 60 of the seat shell 24 can also include an integrally molded spring seat, such as the recessed annularly shaped spring seat 92 shown in FIG. 5. A coil spring 62 is shown received in the integrally molded spring seat 92 of the seat shell 24. When the latch 36 is assembled to the shell 24, the spring 62 is disposed between the latch bar 58 and the shell 24 to urge the latch 36 toward a fore-aft retaining or locking position.

FIG. 6 illustrates a preferred embodiment of a snap-in slide bearing 26 constructed in accordance with the invention. Each slide bearing 26 also has a head 90 that is smaller than a base 88 from which the head 90 projects. The head 90 includes a pair of end walls 94 and a pair of longer side walls 96. In a preferred embodiment, the head 90 is of generally rectangular cross section as is the base 88 with the base 88 including a flange 89 that extends outwardly of the head 90.

Each slide bearing head side wall 96 has a longitudinally extending groove 68 formed therein extending the entire length of the sidewall 96 with the groove 68 configured to slidably receive part of the slide plate in a manner the same or like that previously discussed above. Each groove 69 preferably is defined by an upraised elongate slide bearing surface 108 extending along the groove 69 that is disposed between a pair of generally parallel elongate channels 110. Such a configuration helps accommodate tolerance variations while helping to ensure smooth sliding operation when assembled to a slide plate 28.

Figure 7:
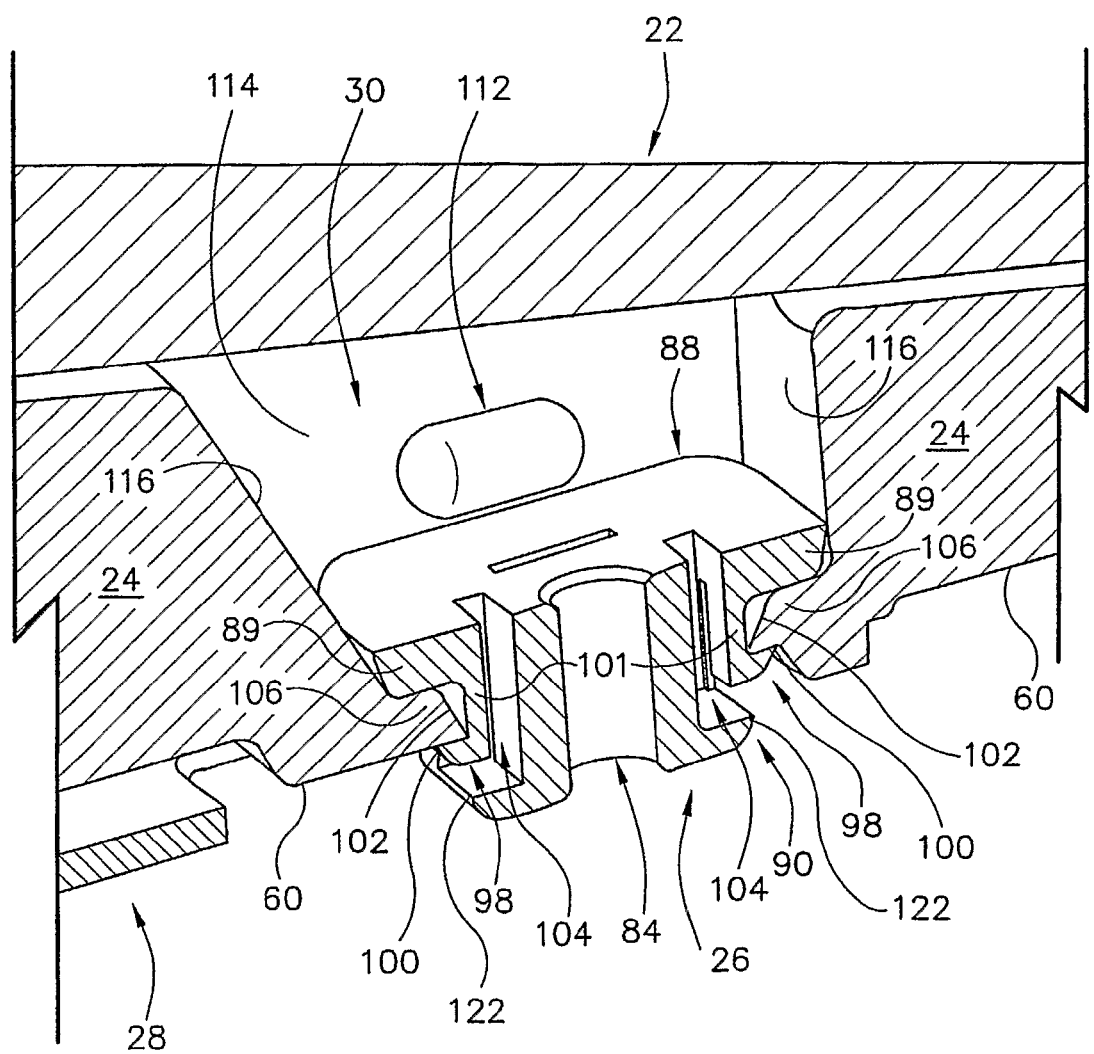
FIG. 7 is a longitudinal cross sectional view of a seat slide bearing mounted in a seat shell and engaging a slide plate.

With additional reference to FIG. 7, each end wall 94 has a flexible cantilever snap 98 that engages part of the seat shell 24 in a manner preferably in accordance with that depicted in FIG. 7 when the slide bearing 26 is assembled to the shell 24. Each cantilever snap 98 includes an outwardly projecting hook 100 at or adjacent its free end that cams over an inclined part 102 of the shell 24 during assembly until the hook 100 clears the inclined part 102 of the shell. Each end wall 94 has a recess or pocket 104 behind the snap 98 to provide room for allowing the snap 98 to flex when camming over a corresponding inclined part 102 during snap-in assembly into the shell 24. When assembled, part of the flange 89 of the slide bearing base 80 abuts against a retainer lip 106 that helps define at least part of the through-opening in the slide bearing retainer pocket 30. If desired, a chamfer as well as an undercut or the like can be provided on one or both of the slide bearing 26 and its retainer pocket 30 to facilitate assembly, retention and/or location.

During assembly, the cantilever snaps 98 flex inward as the slide bearing 26 is pushed through the opening in the retainer pocket 30 in the shell 24 and flex outward to engage part of the bottom surface 60 of the shell 24 to help keep the slide bearing 26 engaged with the shell 24. In one preferred embodiment, the cantilever snaps 98 of each slide bearing 26 and shell 24 are configured to provide a permanent snap fit therebetween that preferably prevents disassembly.

FIG. 7 illustrates a cross section of the snap-in slide bearing 26 of FIG. 6 installed into a bearing receiving pocket 30 in the seat shell 24. The bearing 26 is slidably received in a slot or channel of the slide plate 28. The seat shell contains a molded recess that forms the pocket 30 and a through opening into which the head 90 of the slide bearing 26 is installed. The cantilevered snaps 98 each cam over an inclined wall 102 molded into the shell 24 until reaching a seating recess in which its hook 100 seats, preferably in the manner shown in FIG. 7. A pair of oval protrusions 112 are molded into opposite sidewalls 114 of the slide bearing pocket 30 formed in the shell 24 to provide a secondary snap feature that engages the anchor base 88 of the slide bearing 26 by abutting against it thereby functioning as a stop to prevent the slide bearing 26 from backing out. As is also shown in FIG. 7, the anchor base 88 of the slide bearing 26 abuts against an inwardly projecting flange 106 bounding at least part of the through-opening of the pocket 30 formed in the shell 24 through which the slide bearing head 90 projects to positively stop the slide bearing 26 from being pushed/pulled outwardly through the bearing receiving pocket 30.

Figure 8:
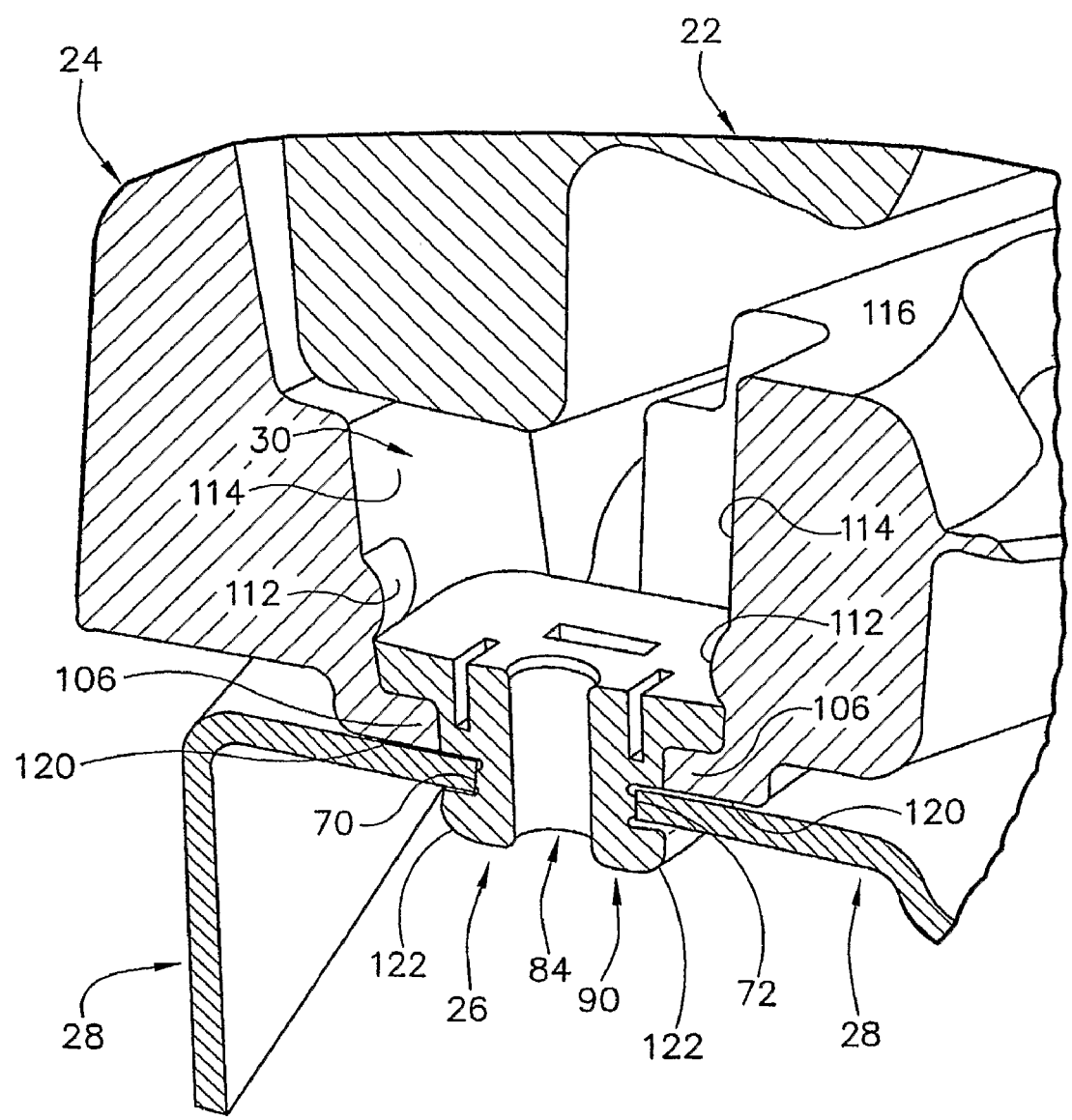
FIG. 8 is a transverse cross sectional view of the seat slide bearing mounted in the seat shell and engaging the slide plate shown in FIG. 7.

FIG. 8 illustrates a second cross section of the snap-in slide bearing 26 shown in FIG. 6 that is installed into the opening in the pocket 30 of the seat shell 24. This cross section is transverse to the cross section shown in FIG. 7. As is shown, the pocket 30 is part of an outwardly offset portion 120 of the shell 24 that extends outwardly from the bottom of the shell 24 so as to be capable of slidably resting on a top surface of the slide plate 28. This increases the surface area of contact therebetween which reduces the load transmitted through the slide bearing to the slide plate 28. As is shown in FIG. 8, the grooves 68 in the slide bearing 26 define an outwardly extending flange 122 that extends outwardly so as to overlie part of the slide plate 28 when the bearing 26 is slidably received in a slot or channel in the slide plate 28.

Figure 9:
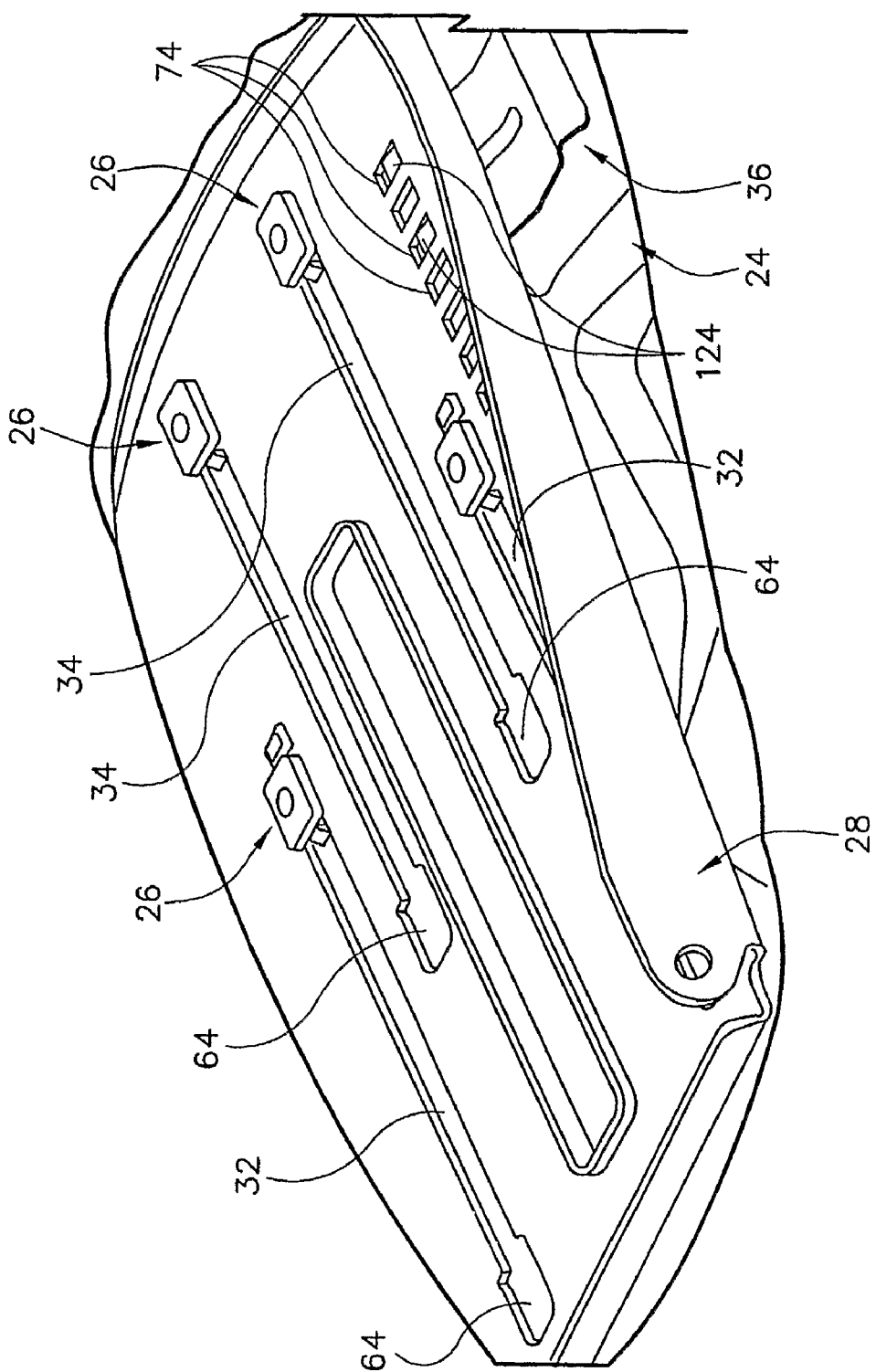
FIG. 9 is fragmentary perspective bottom view of the seat assembly and seat mount with parts partially transparent for clarity.

FIG. 9 shows a configuration with four slide bearings 26 movably received in a corresponding channel or slot 32, 34, e.g., track, of a seat slide plate 28 correspondingly configured. The head 90 of each slide bearing 26 includes a pair of opposed and parallel grooves 68 which each receive a corresponding slide plate edge 70, 72 that define a corresponding channel or slot 32, 34 in the slide plate 28. FIG. 9 also shows the seat slide latch 36 having a pair of spaced apart teeth 124 engaged in a corresponding pair of latch notches 74 in the slide plate 28 to prevent fore-aft relative motion between the seat arrangement 20 and the slide plate 28 when in a latched position. The latch 36 is displaced, such as by being manually lifted, to permit an operator to change the fore-aft position of the seat arrangement 20 to the extent travel of each slide bearing 26 in its corresponding slide plate channel or slot 32, 34 permits.

Figure 10:
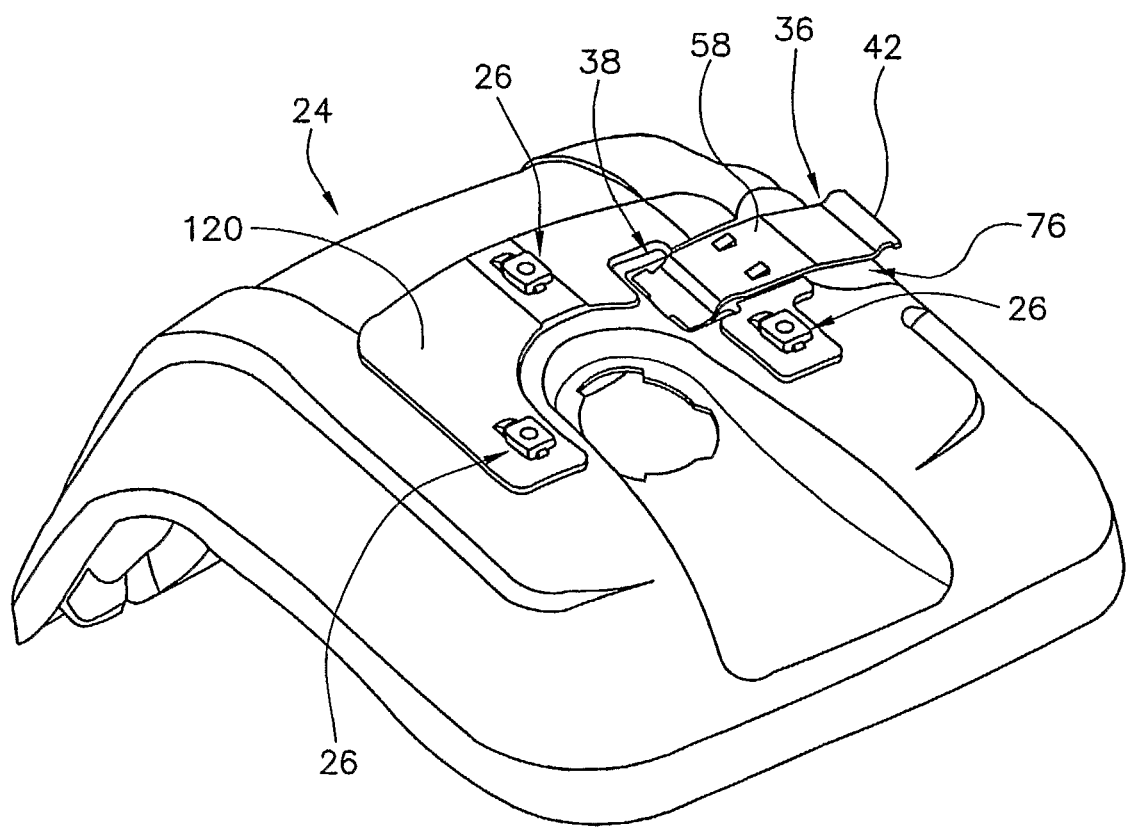
FIG. 10 is a bottom perspective view of a seat shell with latch arrangement attached.

FIG. 10 illustrates a latch 36 that is spring biased by the spring 62 shown in FIG. 5 to permit fore-aft seat position adjustment. The latch 36 seats in a recessed latch bar channel 126 (FIG. 5) with one end pivotally received in the latch receiver pocket 38 and its handle 42 extending outwardly of the shell 24.

Figure 11:
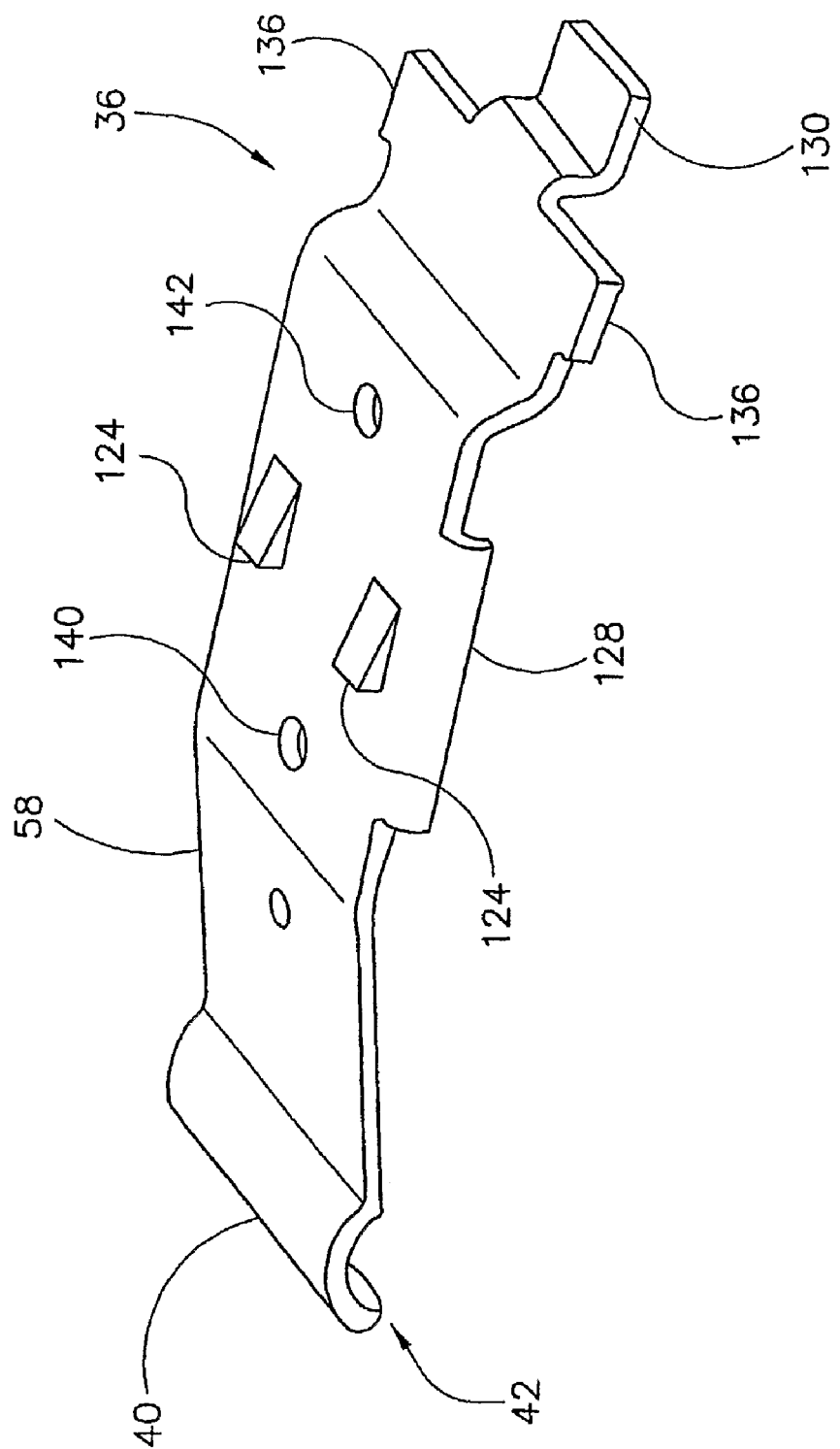
FIG. 11 is an enlarged perspective view of a preferred embodiment of a fore-aft adjustment seat latch arrangement.

FIG. 11 illustrates the latch 36 depicted in FIG. 10 in more detail. The latch 36 is made of a latch bar 58 that is of one-piece construction formed from a metal that preferably is steel. With additional reference to FIGS. 12-14, the latch bar 58 contains a U-shaped handle 40 at one end to provide a comfortable surface for an operator to grip, has a pair of spaced apart slide plate engaging teeth 124, a pair of formed tabs 128 that provide a surface to transfer fore-aft loads to a latch seating recess 126 formed in the seat shell 24, and a single formed tongue 130 at the other end that engages a tongue-receiving slot 134 formed in the shell 24 to create a pivot and retain the latch 36 in the transverse direction. The latch 36 is further retained in the transverse direction by two ears 136 protruding perpendicular to a longitudinal latch centerline, each of which engage in a recess 138 molded into the shell 24. The latch bar 58 can also include a plurality of locator apertures 140 and 142 that engage upraised protrusions (not shown) molded in the shell 24 during latch operation.

Figure 12:
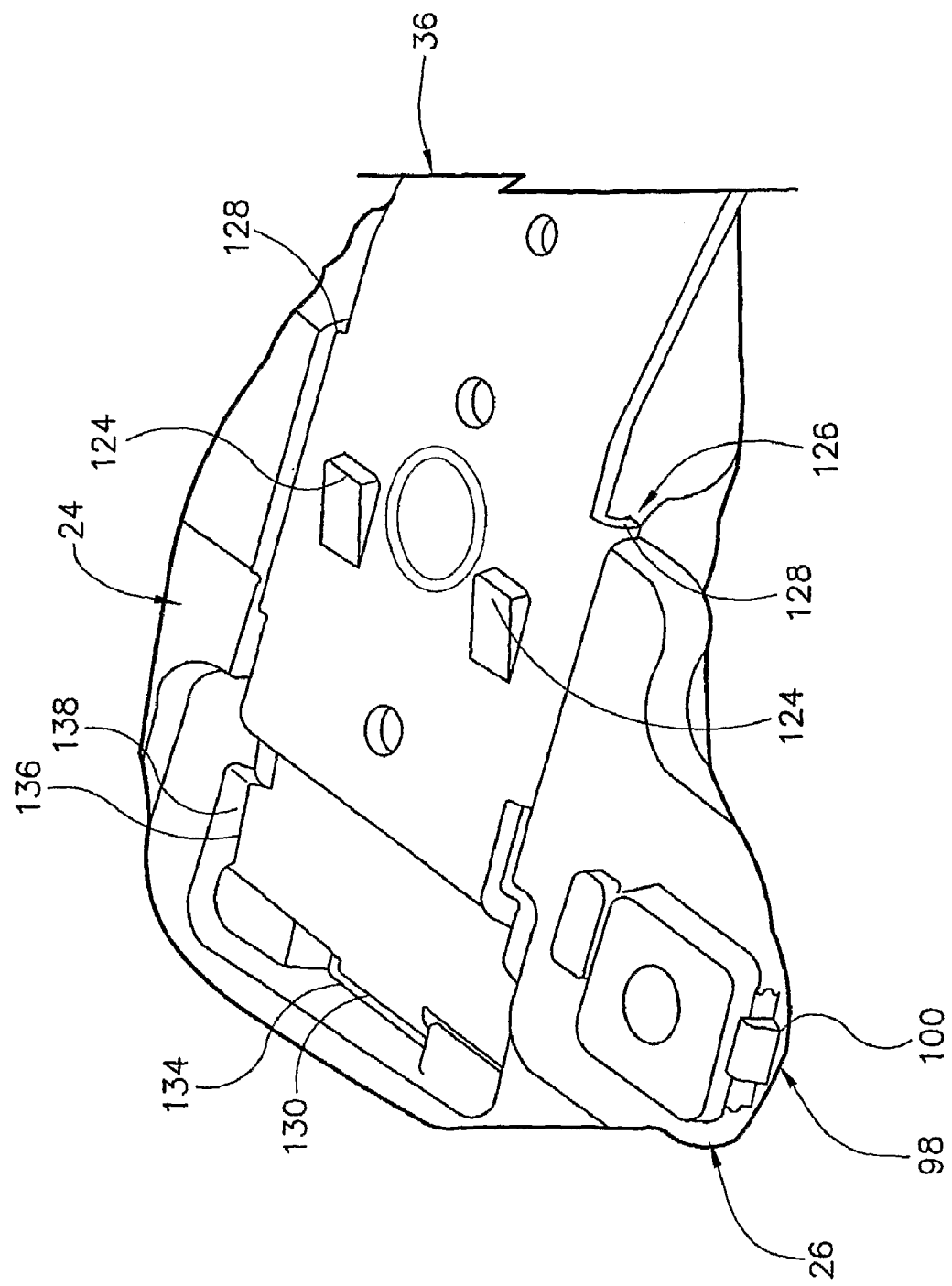
FIG. 12 is a partial fragmentary perspective view of the latch arrangement mounted to a seat shell.
Figure 13:
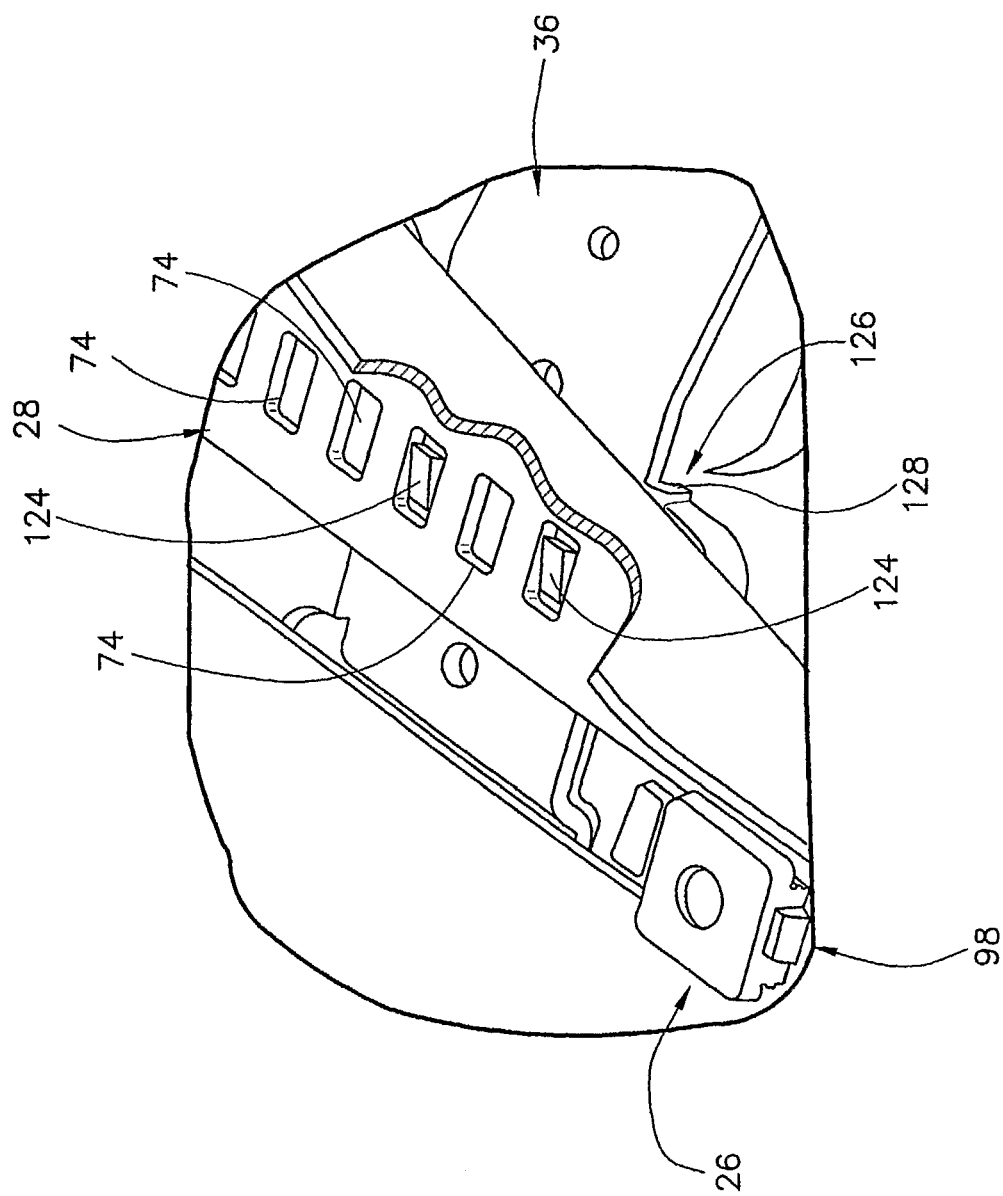
FIG. 13 is a is a partial fragmentary perspective view of the latch arrangement mounted to a seat shell with a portion of a seat slide plate shown partially transparent for clarity.
Figure 14:
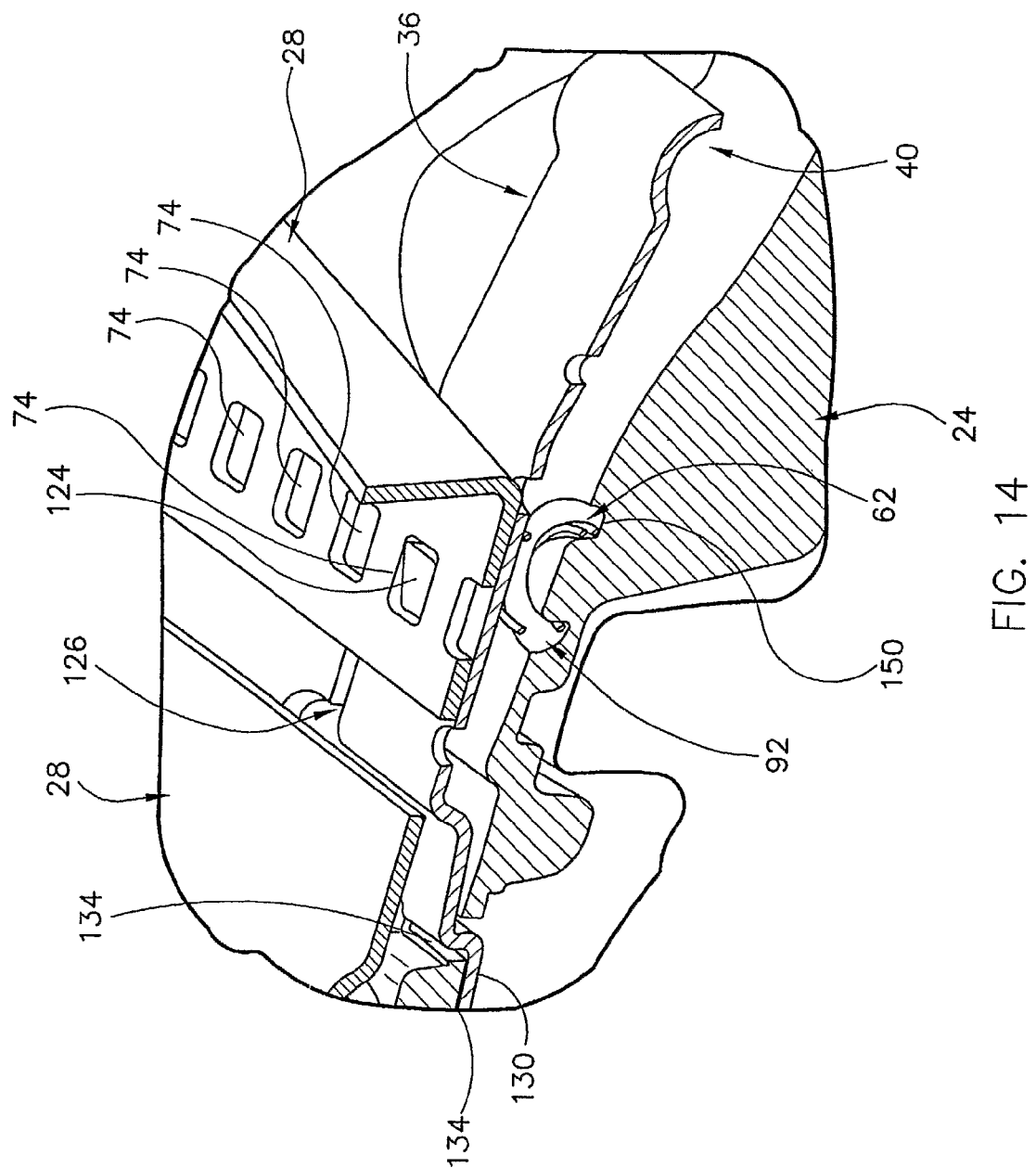
FIG. 14 cross sectional view of the seat shell, slide plate and latching arrangement depicted in FIGS. 12 and 13.

FIG. 12 is similar to that of FIGS. 13 and 14 except the slide plate is removed. The seat shell has a molded in channel that engages two formed tabs on opposite sides of the latch handle, a slot that captures the formed tongue on one end of the handle, and a pair of recesses that engage a pair of ears on the handle.

FIG. 13 provides additional details of a presently preferred bearing embodiment received in a channel or slot 34 disposed in the seat slide plate 28. Also shown is part of the fore-aft adjustment latch 36 and details of the slide plate 28, namely spaced apart notches or detents 74 located in a line, which are engageable by teeth 124 of the latch 36 to prevent fore-aft seat movement.

FIG. 14 is a cross section through the seat shell 24, latch 36, and slide plate 28 showing various details of construction including an integrally molded spring seat 92 formed in the bottom surface of the seat shell 24. The biasing spring 62, preferably a compression spring, forces the latch 36 towards the slide plate 28 keeping its pair of teeth 124 engaged in a corresponding one of the support plate notches 74.

The invention primarily relates to a seat mount assembly 21 that provides fore and aft adjustment for a vehicle seat for a vehicle, such as a tractor, lift truck, or other off-road vehicle. The seat mount assembly 21, in one embodiment, includes a seat shell 24 with provisions for retaining bearing elements, slide bearings 26, and a latching element 36 that engages a seat support 28. The seat consists of a seat cushion 22 attached to a seat shell 24 for supporting the operator of a vehicle. The seat mount 21 includes a lower generally horizontal portion of the seat shell 24 that provides integral features to locate and retain bearing elements 26 that allow the seat to slide with respect to the seat support 28 and securely attach the seat to the seat support 28 and transfer the forces associated with an operator sitting in a seat to the seat support 28.

The seat shell 24 contains internal features that capture a number of slide bearings 26 that are fixed with respect to the seat. Internal shell 24 features include bearing receiving recesses 30 containing sidewalls 114, 116 and a bottom wall 106. The bottom wall 116 contains a hole that is sized to provide a close fit with the slide bearing 26. Each slide bearing 26 is assembled to the seat shell 24 without fasteners by preferably utilizing a snap-fit to retain the slide bearings 26 in the shell 24. Each slide bearing 26 includes a pair of parallel spaced channels 68 receiving a corresponding plate edge 70, 72 that define a corresponding track or slot 32, 34 in the seat support 28. The shell 24 also contains pads 120 surrounding each slide bearing 26 capable of contacting the seat support 28 to provide a smooth flat surface that minimizes bearing surface area in contact with the seat support 28 to provide a low friction interface therebetween to minimize the force the operator must exert to adjust the seat in the fore and aft directions. The support plate 28 is contained between the lower flange 122 of the slide bearing channel 68 and the pads 120 molded on the bottom of the shell 24. The space between the lower flange 122 that helps define the slide bearing channel 68 and the pad 120 molded on the bottom of the seat shell 24 is sized to minimize the clearance and closely match the material thickness of the seat support 28. In a preferred embodiment, the seat shell 24 is blow molded using high density polyethylene or preferably high molecular weight high density polyethylene. In a preferred embodiment the slide bearings 26 are injection molded from nylon 6 or nylon 6/6.

The seat shell 24 also contains features to pivotally attach and retain a latch bar 58 of a fore-aft seat adjustment latch 36 that releasably engages the seat support 28 and is disposed in a recess 126 configured to locate a spring 62 used to bias the latch bar 58 towards the seat support 28. The latch 36 preferably is a latch bar 58 of one-piece construction formed preferably from cold rolled UNS G10080 or G10100 steel. The latch bar 58 contains a U-shaped end 40 to provide a comfortable surface for an operator to grip, a pair of spaced apart teeth 74, a pair of formed down-turned tabs 128 that provide a surface to transfer fore-aft loads to a channel in the seat shell 24, and a single S-shaped tongue 130 that engages a slot 134 in the shell 24 to create a pivot and retain the latch 36 in the transverse direction. The latch 36 is further retained in the transverse direction by two ears 136 protruding perpendicular to the latch centerline that engage in a recess molded into the shell 24. The seat shell 24 has a molded in channel 38 that engages the two formed tabs 136 on opposite sides of the latch bar 58, a slot 134 that captures the tongue 130 on one end of the latch bar 58, and a pair of recesses 138 that engage a pair of ears 136 on the latch bar 58, and an outboard relief 76 to provide clearance for hand operation of the latch 36. The channel 38, slot 134, and recesses 138 in the seat shell 24 are sized to closely fit the tabs 136, the tongue 130 and the ears 136 on the latch 36 to stabilize the latch 36, seat, and slide plate 28 in the fore-aft direction during use. The slot 134 and recesses 138 further cooperate with the latch tongue 130 and ears 136 to prevent the latch bar 58 from being removed from the seat shell 24 after assembly to the support plate 28.

The latch 36 is assembled to the shell 24 by positioning the latch bar 58 at an angle with respect to the bottom surface of the shell 24 and aligning the tongue 130 on one end of the latch bar 58 with the recess formed in the shell 24 and the slot 134. The latch bar 58 is manipulated to insert the tongue 130 through the slot 134 and the handle 40 of the latch bar 58 is rotated towards the bottom surface of the seat shell 24.

The seat shell 24 also contains a recessed seat 92 shaped to accept a biasing spring 62, preferably a compression spring. As is best shown in FIG. 14, the seat 92 is an annular groove 150 molded into the bottom of the shell 24 and sized to accept the outside diameter and inside diameter of the compression spring 62. The compression spring 62, preferably zinc plated music wire, is placed in the annular groove 150 prior to installation of the latch bar 58. As the latch bar 58 is rotated into position, the compression spring 62 is deflected or compressed. The compression is spring 62 captured between the seat shell 24 and the latch bar 58. The latch bar 58 is spring biased towards the seat support 28 and engages notches 74 formed in the seat support 24.

Each slide bearing 26 is a rectangularly shaped unitary molded plastic part. The slide bearing 24 consists of a head 90, a base 88, a pair of cantilevered snaps 98 extending from the base 88, a pair of parallel channels 68 traversing the base 88 and a lower flange 122. The head 90 of the slide bearing 26 extends beyond the width and length of the base 88 to create a surface that contacts the bottom wall of the bearing receiving recess 30 molded into the seat shell 24. A pair of cantilevered snaps 98, each consisting of a hook 100 and a beam 101, are molded into the body of the slide bearing 26. Each hook 100 and beam 101 is created through the use of cores or inserts (not shown) in the molding tooling (not shown). The cantilevered snaps 98 flex inward towards the center of the slide bearing body as the slide bearing 26 is inserted through the hole in the bottom wall of the shell recess 30. When the slide bearing 26 has been pushed sufficiently into the recess 30 the cantilevered hooks 100 "snap" outward capturing the edges of the bottom wall of the recess 30. The slide bearing 26 is retained in the recess 30 by the hook 100 engaging one side of the shell bottom wall and the base 88 contacting the other.

Two opposite side walls 114 in the shell recess 30 each contain an oval shaped protrusion 112. When the slide bearing 26 is pushed into the recess 30, the end walls of the head 90 come in contact with the oval protrusion 112. The end walls of the head 90 are angled to create a ramp that cams along the protrusion as the slide bearing is further pushed into the recess. When the slide bearing 26 has been fully installed, the bottom surface of the head 90 contacts the bottom wall of the recess 30 and the top edge of the base 88 contacts the oval protrusion 112. The engagement between the base 88, protrusion 112, recess bottom wall 106, hook 100 and bottom wall edge of the shell 24 securely attach the slide bearing 26 to the shell 24.

A pair of parallel channels 68 spaced from the base 88 extend the length of the head 90. The vertical wall of each channel 68 contains a protruding rib 108. The distance between the pair of ribs 108 is closely matched to the width of the slot 32 or 34 in the seat support 28. In a preferred embodiment, the channels 68 are approximately 25 mm in length. The slide bearing 26 preferably is rectangular in shape allowing the creation of a pair of channels 68 of a sufficiently significant length that engage the slot 32 or 34 in the seat support 28. The length of the channels 68 provides a significant surface area of contact between its ribs 108 and the edge 70, 72 defining the slot 32 or 34 in the seat support 28, improving the wear resistance of the slide bearing 26 and extending the useful product life.

Each slide bearing 26 also contains a centrally located through hole 84. The hole 84 preferably is internally threaded to receive an externally threaded fastener (not shown). In one embodiment, the latch 36 and biasing spring 62 are omitted and a threaded knob 78 is inserted through a cupped washer 82, through the bottom of the seat support 28, e.g., seat mounting plate, and into the hole 84 in a slide bearing 26. The threaded knob 78 is tightened thereby hand fixing the mounting plate 28 to the seat shell 24. Loosening the knob 78 allows the seat fore-aft position to be adjusted to an infinite number of positions defined by the length of the slot 32, 34 in the mounting plate 28.

During the manufacturing of the seat, the slide bearings 26 preferably are manually installed into recesses 30 molded into the bottom of the seat shell 24. The seat cushion 22 is then attached to the inner surface of the seat shell 24 using any of a variety of known processes. In the preferred embodiment the seat cushion 22 is secured to the seat shell 24 using an adhesive.

The seat support 28 contains elongated slots 32, 34, positioned to align and engage a plurality of slide bearings 26 located in the shell 24 of the seat. At one end of each elongate slot 32, 34, the opening is enlarged 64 and is slightly larger than the width and length of the head 90 of the slide bearing 26. The seat support 28 also contains a number of equally spaced holes 74 that align with the pair of teeth 124 integrally formed such as by being stamped into the latch bar 58. The teeth 124 of the latch 36 are spaced to align with and engage every other hole 74 in the seat support 28. The length of the elongated slots 32, 34 and the fore-aft staggered spacing of the slide bearings 26 in the seat shell 24 determines the amount of fore and aft travel of the seat shell 24 with respect to the seat support 28. The number of holes 78 in the seat support 28 is selected to provide for latched positions at multiple increments through the desired range of fore-aft adjustment.

In a preferred embodiment, the quantity of slide bearings 26, the quantity of recesses 30 in the shell 24 to receive and retain the slide bearings 26, and quantity of slots 32, 34 in the seat support is three. The slide bearings 26 are arranged in a triangular pattern with two of the slide bearings 26 located towards the front of the seat shell 26 and the third slide bearing 26 located on the seat centerline and spaced aft of the forward pair of slide bearings 26. The two slide bearings 26 positioned towards the front of the shell 26 cooperate to transfer forces applied to the seat 56 and backrest 54 to the seat support 28. The third, aft located slide bearing 26 also cooperates with the forward pair of slide bearings 26 to transfer forces to the seat support 28 and further stabilize the seat shell 24 from yaw. The length of channels 68 on each slide bearing 26 and the length of the flange 122 forming the bottom of each slide bearing channel 68 further improve the load carrying capability and the stability of the seat and mounting plate assembly 21.

In an alternate arrangement four slide bearings 26 and four recesses 30 in the shell 24 to receive and retain the slide bearings 26 can be arranged to align with four staggered parallel slots 32, 34 or two parallel aligned slots 32, 34 in the seat mounting plate 28. The arrangement and quantity of the slots 32, 34 in the seat mounting plate 28 is dependent upon the desired amount fore and aft travel and the desired overall length of the seat mounting plate 28. In a four slide bearing arrangement, the holes in the seat support 28 can be located on the centerline of the seat assembly 21 allowing the latch 36 and its teeth 124 to be centrally located thereby further reducing the tendency of the seat to yaw during use.

In assembly, the seat shell, seat cushion, and slide bearing assembly is preferably attached to the seat mounting plate without the use of fasteners. The latch handle and biasing spring are assembled to the seat shell as previously described. The latch handle is held against the seat shell compressing the biasing spring prior to installing the seat assembly to the seat mounting plate. Each slide bearing is aligned with the enlarged matched opening at one end of each slot in the seat mounting plate. The seat assembly is lowered onto the mounting plate until the pads on the bottom of the seat shell come in contact with the surface of the mounting plate and the channels in the slide bearings align with the mounting plate slots. The seat is then slid aft fully engaging each bearing with each slot. The latch handle is released and comes into contact with the surface of the mounting plate. The seat is slid until the teeth in the latch handle engage the holes in the seat mounting plate. At the end of one of the slots, a spring clip can be used to limit the forward travel of the seat and prevent the slide bearings from realigning with the enlarged openings at the ends of the slots. Alternatively a washer and threaded fastener can also be used to cover one of the enlarged openings It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:
1. A fore-aft adjustable vehicle seat mount assembly comprising:
    a vehicle seat having a bottom surface with an opening formed therein; and
    a slide bearing received in the opening and comprising an interiorly disposed retainer base from which extends a narrower head that comprises an exteriorly disposed slide-plate engaging flange; and wherein the retainer base comprises a pair of oppositely extending and generally parallel slide bearing retainer flanges each disposed in engagement with a portion of the vehicle seat.

2. The adjustable vehicle seat mount assembly of claim 1 wherein the slide bearing is disposed in snap-fit engagement with a portion of the vehicle seat.

3. The adjustable vehicle seat mount assembly of claim 1 wherein the retainer base is generally rectangular.

4. The adjustable vehicle seat mount assembly of claim 3 wherein the head is generally rectangular.

5. The adjustable vehicle seat mount assembly of claim 1 wherein the head of the slide bearing has a hole formed therein in which a knob is received.

6. The adjustable vehicle seat mount assembly of claim 1 wherein the vehicle seat comprises a seat shell and wherein each slide bearing retainer flange is disposed in abutment with the seat shell.

7. The adjustable vehicle seat mount assembly of claim 6 wherein the seat shell is comprised of plastic.

8. The adjustable vehicle seat mount assembly of claim 7 wherein the opening comprises a pocket formed in the seat shell.

9. The adjustable vehicle seat mount assembly of claim 1 further comprising a slide plate having a generally fore-aft extending elongate slot formed therein defined by a pair of spaced apart slide plate slot edges that receives the head of the slide bearing with the slide-plate engaging flange in slidable engagement with the slide plate.

10. The adjustable vehicle seat mount assembly of claim 9 wherein the head of the slide bearing comprises a pair of oppositely outwardly and generally parallel slide-plate engaging flanges disposed in slidable engagement with a corresponding one of the slot-defining edges of the slide plate.

11. The adjustable vehicle seat mount assembly of claim 9 wherein the slide plate is comprised of metal.

12. The adjustable vehicle seat mount assembly of claim 9 comprising a plurality of the slide bearings, wherein the vehicle seat has a plurality of spaced apart openings formed therein each receiving a corresponding one of the slide bearings, and wherein the slide plate has a plurality of generally parallel fore-aft extending elongate slots formed therein each of which receives the head of a corresponding one of the slide bearings.

13. The adjustable vehicle seat mount assembly of claim 9 wherein the bottom outer surface of the vehicle seat is disposed on one side of the slide plate and each one of the slide-plate engaging flanges of the slide bearing is disposed on the opposite side of the slide plate.

14. The adjustable vehicle seat mount assembly of claim 13 wherein the retainer base is disposed in abutment with a portion of the vehicle seat on the one side of the slide plate.

15. A fore-aft adjustable vehicle seat mount assembly comprising:
(a) a slide plate having a plurality of generally fore-aft extending elongate slots formed therein that is each defined by a pair of spaced apart slide plate slot edges;
(b) a vehicle seat having a bottom surface with a plurality of openings formed therein; and
(c) a plurality of slide bearings each comprising (1) a retainer base interiorly disposed within the vehicle seat in abutment with a portion of the vehicle seat having a pair of interiorly disposed and oppositely extending flanges each disposed in abutment with a portion of the vehicle seat, and (2) a head extending through a corresponding one of the openings exteriorly of the vehicle seat that is received in slidable engagement in a corresponding one of the fore-aft extending slots formed in the slide plate enabling fore-aft relative movement between the seat shell and slide plate.

16. The adjustable vehicle seat mount assembly of claim 15 wherein the head of each slide bearing is narrower than the retainer base.

17. The adjustable vehicle seat mount assembly of claim 15 wherein the retainer base is generally rectangular.

18. The adjustable vehicle seat mount assembly of claim 15 wherein the vehicle seat comprises a seat shell and wherein each slide bearing comprises a pair of oppositely extending snaps disposed in engagement with the seat shell.

19. The adjustable vehicle seat mount assembly of claim 15 wherein the vehicle seat comprises a seat shell and wherein each slide bearing retainer flange is disposed in contact with the seat shell.

20. The adjustable vehicle seat mount assembly of claim 19 wherein the head of each slide bearing comprises a pair of oppositely extending and generally parallel slide-plate engaging flanges disposed in slidable engagement with a corresponding one of the slot-defining edges of a respective one of the slots formed in the slide plate.

21. A fore-aft adjustable vehicle seat mount assembly comprising:
(a) a slide plate having a plurality of spaced apart, generally fore-aft extending, and generally parallel elongate slots formed therein each defined by a pair of spaced apart slide plate slot edges;
(b) a seat shell comprising a plurality of spaced apart pockets formed therein; and
(c) a plurality of slide bearings each disposed in snap-fit engagement with the seat shell comprising (1) a base received in a corresponding one of the pockets in abutment with the seat shell, (2) a head narrower than the base that extends from the base outwardly of the pocket that is received in a corresponding slot in the slide plate, and (3) a pair of oppositely extending and generally parallel slide-plate engaging flanges extending outwardly from the head in slidable engagement with a corresponding one of the slide plate slot-defining edges of the slot.

22. A fore-aft adjustable vehicle seat mount assembly comprising:
(a) a slide plate having a plurality of spaced apart, generally fore-aft extending, and generally parallel elongate slots formed therein each defined by a pair of spaced apart slide plate slot edges;
(b) a seat shell comprising a plurality of spaced apart pockets formed therein; and
(c) a plurality of slide bearings each comprising (1) a base received in a corresponding one of the pockets and having a pair of oppositely extending and generally parallel bearing retainer flanges in abutment with the seat shell, (2) a head narrower than the base that extends from the base outwardly of the pocket that is received in a corresponding slot in the slide plate, and (3) a pair of oppositely extending and generally parallel slide-plate engaging flanges extending outwardly from the head in slidable engagement with a corresponding one of the slide plate slot-defining edges of the slot.

23. A fore-aft adjustable vehicle seat mount assembly comprising:
(a) a slide plate having a plurality of spaced apart, generally fore-aft extending, and generally parallel elongate slots formed therein each defined by a pair of spaced apart slide plate slot edges;

(b) a seat shell having a bottom outer surface and comprising a plurality of spaced apart pockets formed therein; and (c) a plurality of slide bearings each disposed in snap-fit engagement with the seat shell and comprising (1) a base received in a corresponding one of the pockets having a pair of oppositely extending and generally parallel bearing retainer flanges in abutment with the seat shell, (2) a head narrower than the base that extends from the base outwardly beyond the bottom outer surface of the seat shell that is received in a corresponding slot in the slide plate, and (3) a pair of oppositely extending and generally parallel slide-plate engaging flanges extending outwardly from the head in slidable engagement with a corresponding one of the slide plate slot-defining edges of the slot.

* * * * *